June 7, 1966 K. SCHLUTER 3,255,406
APPARATUS FOR DETERMINING DISTURBANCES ALONG ELECTRICAL
LINES UTILIZING THE IMPULSE REFLECTION METHOD INCLUDING
CONTROLLABLE EQUALIZING MEANS COMPRISING
A TWO-CHANNEL AMPLIFIER
Filed Sept. 25, 1963 2 Sheets-Sheet 2

United States Patent Office 3,255,406
Patented June 7, 1966

3,255,406
APPARATUS FOR DETERMINING DISTURBANCES ALONG ELECTRICAL LINES UTILIZING THE IMPULSE REFLECTION METHOD INCLUDING CONTROLLABLE EQUALIZING MEANS COMPRISING A TWO-CHANNEL AMPLIFIER
Klaus Schluter, Munich, Germany, assignor to Siemens & Halske Aktiengesellschaft, Berlin and Munich, Germany, a corporation of Germany
Filed Sept. 25, 1963, Ser. No. 311,595
Claims priority, application Germany, Sept. 28, 1962, S 81,760
10 Claims. (Cl. 324—52)

The present invention relates to an apparatus for use with an electrical transmission line under test, for testing impedance irregularities therein, and is more particularly concerned with an apparatus in which in accordance with a known impulse reflection method short test impulses are transmitted down the line and the reflection voltages reflected from irregularities therein are observed and measured.

In accordance with the known pulse reflection method, places of faults or inhomogeneities of a line or cable are determined by conducting, to the input of a given line, test pulses of suitable shape and evaluating the reflection voltages returned from the defect points to the input of the line. The value of the reflection voltages makes it possible to draw conclusions as to the magnitude of a given fault while the phase position thereof or the travel time of the transmitted test pulses permits conclusions as to the distance of the faults from the input of the line. The evaluation is customarily effected by deflecting the electron beam of a cathode ray tube linearly in time in horizontal direction synchronously with the train of test pulses transmitted and feeding to the vertical deflection device the reflection voltages received, so that they appear on the picture screen as deflections from the horizontal time axis. A given section on the time axis thus corresponds to a given pulse travel time and consequently to a given path or length on the line, measured from the input thereof.

If the pulse reflection method is to lead to exact measurement results, it is necessary, as is known, to take into consideration the frequency-dependent attenuation properties of the line or cable. It must be considered in this connection that a strong increase in the line attenuation for higher frequencies results in a stronger attenuation of a pulse passing through the line, in the higher frequencies of its frequency spectrum, so that a deformation occurs which expresses itself primarily in a rounding of the pulse sides and corners. Since this pulse deformation appears progressively more pronounced with the increase in the line lengths traversed, points of faults or inhomogeneities which are further away from the line input cannot be accurately evaluated without additional compensating measures.

Accordingly, in the known measuring arrangements, there is effected a compensation of the pulse distortions by conducting the test pulses which are transmitted and/or the reflection voltages which are received, over controllable equalizing means, the frequency response of which is selectively adjustable for the greatest possible correction of the received reflection voltages for different and in particular, insofar as possible, for all line lengths possibly occurring or for the total transit times, respectively. The total travel time consists of the partial travel time of the test pulse conducted to the line until it reaches the respective defect point and the partial travel time of the reflection voltages formed at the defect point, back to the input of the line. For example, amplifiers are used as correction members, the gain frequency response of which can be appropriately adjusted, or else passive attenuation quadripoles having adjustable or optionally connectible circuit elements, the frequency characteristic of which changes correspondingly in each case. For the automatic or point-by-point correction of the reflection image of the entire line, the correction members must be controlled or switched at a function of time, whereby the control operation is periodically repeated with the repetition or sequence frequency of the test pulses.

The object of the present invention is to provide a circuit arrangement for effecting a pulse correction of the resultant reflection voltages in a circuit of the initially mentioned type, which on the one hand can be adjusted continuously, that is, for any desired line location and on the other hand requires relatively little expenditure as compared with the known arrangements. In accordance with the invention, this object is achieved by the provision of a circuit arrangement comprising means for conducting the reflection voltages over a two-channel amplifier, the first channel of which has a gain characteristic which is suitable for impulse correction of a given line length, and the second channel of which has a gain which is as independent of frequency as possible and corresponds to the fundamental gain of the first channel and has a delay member which simulates the average travel time of the first channel, and means for connecting the two channel outputs together by way of a mixer device which takes respectively complementary portions from the first and the second channel output voltages, as a function of a controlled magnitude which can be especially varied in time, and combines such portions to form a sum voltage.

Further features and advantages of the circuit arrangement in accordance with the invention will appear from the appended claims and from the description of a preferred embodiment which is rendered below with reference to the accompanying drawings.

FIG. 1 indicates a known measuring arrangement for determining with the aid of the pulse reflection method points of faults or inhomogeneities on electric lines;

Figure 1:
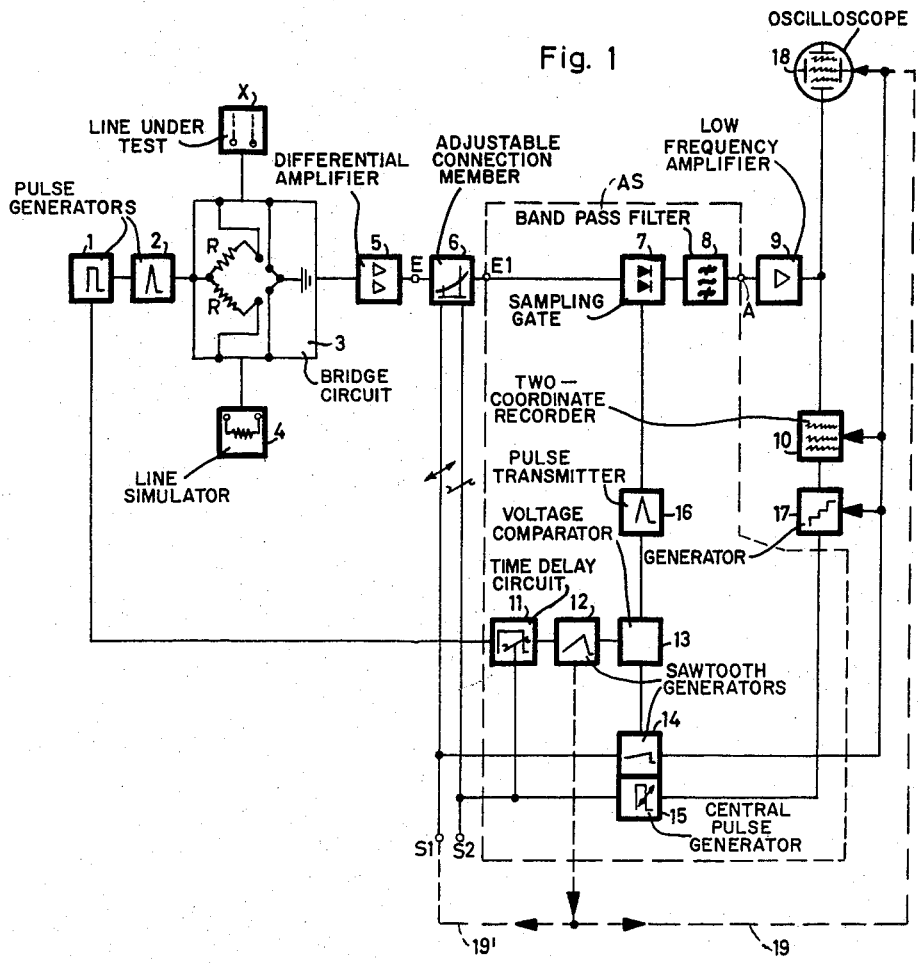

A known measuring arrangement for determining points of faults or inhomogeneities on electric lines by the pulse reflection method will first be described in general with reference to FIG. 1. The illustrated circuit comprises a pulse generator 1 for the synchronization of a pulse generator 2 which transmits the test pulses of customary shape and repetition or sequence frequency. The test pulses pass by way of a bridge circuit 3 to the electric line X which is to be measured with respect to points of fault or inhomogeneity and which has its input terminals inserted in a branch of the bridge, one branch of the bridge being simultaneously formed by a line simulator 4. The bridge circuit which is completed by two further ohmic resistors R effects passage of the test pulses onto the line X but not to the input of a serially disposed differential amplifier 5. The latter is influenced solely by the reflection voltages formed on the line and given off asymmetrically at the bridge output. From the output of the differential amplifier, the received reflection voltages pass to the adjustable correction member 6.

Disregarding for the time being the circuit unit designated AS and assuming that the terminal E1 is connected directly to A, the reflection voltages will pass from the output of the correction member 6 to the low-frequency amplifier 9 and further to the vertical deflection device of the cathode ray oscilloscope 18. The horizontal deflection device is affected by way of a connecting line 19 by a saw-tooth generator 12 which is operatively affected by a time-delay circuit 11. The time-delay circuit 11 is synchronized by the pulse generator 1 in the rhythm of the transmitted pulses. The part of the reflection image periodically defined by the reflection voltage is determined in known manner on the one hand by the width of the sawtooth produced by 12, and on the other hand by the delay effected by 11 with respect to the synchronization pulses supplied by 1.

Figure 2:
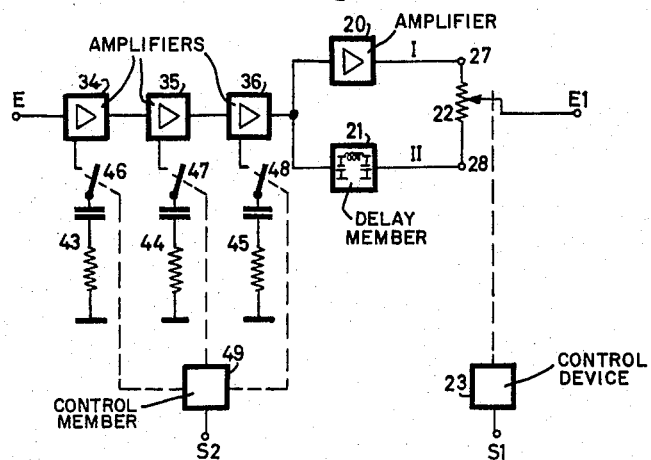
FIG. 2 shows in schematic manner a two-channel amplifier serving, in accordance with the invention, for the correction of received reflection voltages.

The correction member designated 6 in FIG. 1, which serves for the correction of the received reflection voltages consists, in accordance with the invention, essentially of a two-channel amplifier which is shown schematically in FIG. 2. The first channel I contains an amplifier 20 which has a gain characteristic suitable for impulse of a predetermined line length, while the second channel II has a gain which is as independent of frequency as possible, and corresponds to the fundamental gain of the first channel, as well as a delay member 21 which simulates the average travel time of the first channel I. By fundamental gain there is meant here the gain for the low and lowest frequencies. The channel outputs 27 and 28 are—as indicated schematically in FIG. 2—connected to the terminals of a potentiometer 22, the displaceable tap of which is connected to the output terminal E1 of the correction member. The position of the tap determines proportions, in the output voltages at E1, of the output voltages of channels I and II. If the tap is in the upper end position 27 there will be tapped the output voltage of channel I, which is corrected corresponding to the amplification characteristic of 20 for a specific line length, while in the lower end position 28 of the tap, there is tapped the undistorted signal transmitted over channel II. A continuous correction for any desired place of the line within the given line length can be obtained by continuous adjustment between these two end positions. The adjusting of the tap can be effected, for example, mechanically, with the aid of a control device 23 to which a control voltage is fed by way of a terminal S1.

Figure 3:
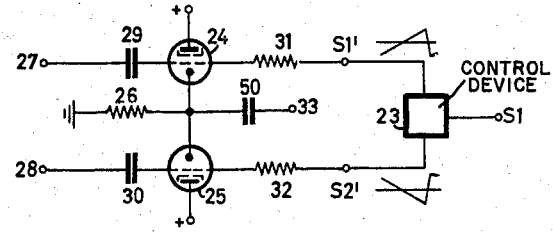
FIG. 3 represents an electronically operating mixing device for use in place of a potentiometer included in FIG. 2.

The electronically operating mixing device shown in FIG. 3, for use in place of the potentiometer 22 of FIG. 2, comprises two cathode-coupled variable-mu tubes 24, 25 having a common cathode resistance 26, to the control grids of which are fed the output voltages of the channels I and II, by way of the terminals 27 and 28 and the coupling capacitors 29, 30. Control voltages are at the same time fed by way of the terminals S1' and S1" and the resistors 31, 32 which effect the mixing of the voltages lying at the channel outputs 27 and 28, on the output side, as described with reference to FIG. 2. There are shown schematically, in FIG. 3, two sawtooth-shaped control voltages in phase opposition which, at the time of the occurrence of the minimum amplitude at S1' or the maximum amplitude at S1", connect the input voltage present at the terminal 28 practically completely by way of the coupling capacitor 50 to the output 33, while at the time of the occurrence of the maximum amplitude at S1' or the minimum amplitude at S1", they effect a connecting of the input voltage present at the terminal 27 to the output 33. Between these extreme values of the control voltages, there takes place a mixing of the channel output voltages which differs according to the possible positions between the end positions of the tap of the potentiometer 22 of FIG. 2.

It is possible to effect with the mixing device shown in FIG. 3, an automatic correction of the deflection voltages, the control operations taking place periodically in time with the test pulses so that the respective image point described on the cathode beam oscilloscope 18 appears already corrected. The control voltage which is to be fed to the control terminal S1 and which effects the automatic continuous correction, is suitably derived from the output voltage of the sawtooth generator 12 by way of a connecting line 19'. The control device 23 serves to produce the control voltages of opposite phase which are to be fed to the terminal S1' and S1" from the sawtooth voltage fed to S1.

In order to obtain the desired mixing action, it is also possible, in the case of the circuit shown in FIG. 3, to replace one of the two control voltages present at S1' and S1" by a direct voltage, since a triggering of the two variable-mu tubes is in such case likewise automatically effected by way of the common cathode resistor 26. The exponential course of the characteristics of the variable-mu tubes, establishes a linear relationship between the respective length of line corrected and the amplitude of the control voltages. However, if the course of the characteristics of the variable-mu tubes differs from an exponential curve, the linear relationship can be restored by a corresponding predistortioning of the control voltages.

In accordance with a preferred further development of the invention, in case of long line lengths which are to be corrected, there is provided a combination of the previously described two channel amplifier with one or more serially connected amplifier units 34, 35, 36 (FIG. 2), each such unit having a gain characteristic which is as similar as possible to that of channel I of the two-channel amplifier. Upon connecting one amplifier unit, the correctible line length is doubled, while upon the connecting a second amplifier device, it is tripled, etc.

Figure 4:
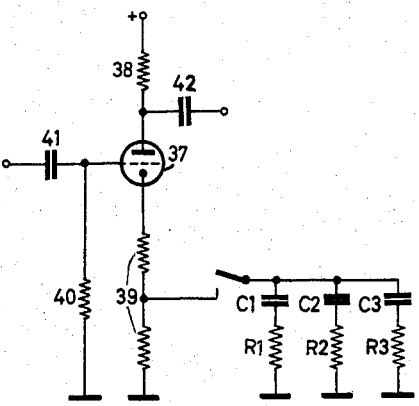
FIG. 4 illustrates an amplifier unit.

The amplifier units 34, 35, 36 are constructed as shown in FIG. 4. Such unit comprises an amplifier stage 37 with a plate resistor 38, a cathode resistor 39, a grid leak resistor 40 and coupling capacitors 41 and 42. A part of the cathode resistor 39 is shown shunted by an RC-network, which comprises a plurality of RC-series combinations R1, C1; R2, C2; R3, C3. This RC-network is so dimensioned that there is obtained the desired amplification characteristic which is just sufficient to provide correction for a given line length. Upon dimensioning the cathode resistor 39 so that with the cathode resistor unshunted, the amplification of the amplifier stage is $v=1$, it is in advantageous manner possible to leave the amplifier units 34, 35, 36 connected at all times in series with the two-channel amplifier and merely connect successively the RC-networks 43, 44, 45 associated with the individual amplifier units in order to effect stepwise increase of the correcting action on the reflection voltages. This is obtained by means of contacts 46, 47 and 48, which are actuated by a control member 49. The control member 49 receives over a control terminal S2, the respective control commands for effecting the connection of the individual RC-networks. The contacts 46, 47 and 48 can, of course, be replaced by electronic switches, such as switch diodes or switch transistors.

The continuous adjustment of the pulse correction within the line length which is correctible by the two-channel amplifier in combination with a plurality of amplifier units is carried out by effecting, with the switch contacts 46, 47 and 48 open, a continuous adjustment of the potentiometer 20 from the lower end position of the tap toward the upper end position thereof, and thereupon, after closing of the contact 46 and consequently connection of the RC-network 43, repeating the potentiometer adjustment for an adjoining partial region on the line, whereby the operation is extended by a partial region of equal magnitude on the line, by the action of the RC-networks of the further amplifier units 35 and 36. The continuous correction adjustment within these individual partial regions can take place mechanically by adjustment of the potentiometer tap at 22 or electronically by the feeding of appropriate control voltages to the terminals S1' and S1" in accordance with FIG. 3.

The circuit arrangement in accordance with the invention is particularly advantageously used in connection with measuring arrangements which contain a so-called stroboscopic scanning stage, such stage being designated AS in FIG. 1. The operation of such a scanning stage is briefly described below.

The scanning stage comprises a sampling gate 7 with an integrating band pass filter 8 connected serially therewith, a pulse transmitter 16, a sawtooth generator 12, a delay circuit 11 and a voltage comparator 13, another sawtooth generator 14 and a control pulse generator 15 for synchronizing the latter. The sawtooth generator 12 which is actuated with delay by means of the delay circuit 11 in the ryhthm of the test pulses extended to the line, produces a sawtooth voltage, the saw-tooth width of which defines the partial image of the reflection voltages to be respectively represented, which is fed to one input of the voltage comparator 13, the other input of which is fed from a sawtooth generator 14. The latter produces a sawtooth voltage of substantially smaller repetition or sequence frequency which is also termed a stroboscopic time deflection voltage. The repetition or sequence frequency of the stroboscopic time deflection voltage is determined by the control pulse generator 15. In the voltage comparator, whenever the rising flank of a sawtooth formed by 12 reaches the instantaneous value of the time deflection voltage of 14, there is produced an output pulse which causes the pulse transmitter 16 to form a needle pulse. These needle pulses, corresponding to the slowly rising stroboscopic time deflection voltage, lie at points of the rising flanks of the sawteeth produced by 12, which points are respectively displaced slightly with respect to each other, being therefore from period to period of the reflection voltages shifted in phase by a given small amount with respect to each other. These needle pulses are fed to the sampling gate 7 which is constructed, for instance, as push-pull modulator circuit, and make such circuit always conductive for the reflection voltages received. The reflection voltages received are therefore passed once in each period for a very short time to the output of the sampling gate 7, corresponding to the time sequence of the individual needle pulses established by the action of the voltage comparator 13, so that an instantaneous value in each case sampled. Since the instantaneous values of successive periods are shifted slightly in phase with respect to each other, there takes place, so to say, a point-by-point stroboscopic scanning or sampling of the reflection voltages with the low repetition frequency of the stroboscopic time deflection. The scanned or sampled instantaneous values of the reflection voltages are in the serially disposed integrating band pass filter 8 reshaped, by the utilization of a storage effect, into impulses of substantially greater length, which impulses practically pass into each other so that the output voltage of the filter 8 describes, as it were, a reflection voltage curve, but with the low repetition frequency of the stroboscopic time deflection voltage. After an amplification in the low frequency amplifier 9, these voltages can be fed to the vertical deflection device of a two-coordinate recorder 10, the horizontal deflection device of which is affected by the stroboscopic time deflection voltage produced by 14. The horizontal deflection device of the cathode beam oscilloscope 18 can also be actuated in the same manner by the stroboscopic time deflection voltage.

In the event that individual measurement sections of the line X to be tested are to be represented in the two-coordinate recorder 10 in respective separate lines, in the form of individual partial reflection images, the sawtooth width of the sawtooth voltage produced by 12 is adjusted to the desired width of a partial reflection image and the delay circuit 11 is actuated so that adjustment is effected successively to a series of given delay values which correspond respectively to the starting points of the individual measurement sections or partial reflection images. The switching from one delay value to the next higher value takes place, for example, by means of switching pulses, which are derived from the pulse generator 15. The pulse generator 15 also controls a generator 17, the output voltage of which is adjustable stepwise in its amplitude. The switching of the amplitude at 17, which takes place in rhythm with the switching pulses given off by 15, effects the setting of the vertical deflection device of the two-coordinate recorder 10 to different lines arranged each below another.

The use of the circuit arrangement according to the invention, for the correction of the reflection voltages, in combination with such a stroboscopic scanning or sampling stage, has the substantial advantage that an automatic, that is, continuous correction can be controlled with the aid of the stroboscopic time deflection voltage of 14, whereby the time conditions are simplified to such extent that the mixing device of the two-channel amplifier can be constructed in a greatly simplified manner in an electronic embodiment, for instance, in accordance with FIG. 3, or can be constructed in particular as potentiometer with mechanical adjusting means in accordance with FIG. 2. This is indicated in FIG. 1 wherein the control terminal S1, provided for the continuous adjustment of the correction member 6, is connected with the sawtooth generator 14. In the case of a multiple-line showing with different partial reflection images, a stepwise adjustment of the RC-networks 43, 44, 45 (FIG. 2) is then further effected by means of the switching pulses which are present at the terminal S2, supplied by the pulse generator 15. It is thereby important that the repetition or sequence frequency of the switching pulses supplied by 15, is so low that the switching- in of the RC-networks 43, 44 and 45 can be effected, in order to reduce the circuit expenditure, over mechanical switches 46, 47 and 48.

Changes may be made within the scope and spirit of the appended claims which define what is believed to be new and desired to have protected by Letters Patent.

I claim:

1. Apparatus for use with an electrical transmission line under test, for testing impedance irregularities therein, comprising a source of controlling impulses, means for generating test impulses at a given rate for application to said transmission line, said controlling impulses being synchronized with said test impulses, a cathode ray oscilloscope having a control grid, horizontal and vertical deflection means for visually indicating the results of the test, means for generating a time deflection voltage for said horizontal deflection means, circuit means connected to said transmission line between said test impulse generator and said oscilloscope connecting the line and the vertical deflection means of said oscilloscope including time-controllable equalizing means for equalizing the distortion of said test impulses, said equalizing means comprising a two-channel amplifier, the first channel of said amplifier having a gain-frequency characteristic for equalizing a specific length of said line, the second channel of said amplifier having a gain independent of frequency and equal to the gain of said first channel for the lowest frequencies, the inputs and outputs of said first and second channels being connected in parallel, phase shifting means in said second channel for equalizing the phase shift produced in said first channel, a mixing device connected to the outputs of said first and second channels, a control device connected with said mixing device and with a voltage generator, said control device having controllable means for causing said mixing device to take complementary parts from the output voltage of said first channel and from the output voltage of said second channel and to combine said parts to form a summary voltage, the ratio of said complementary parts being dependent on the amplitude of a voltage produced by said voltage generator and serving as a control voltage for said control device.

2. Apparatus according to claim 1, wherein said mixing device comprises two cathode-coupled variable-$\mu$ tubes, means for conducting the respective channel output voltages to the control grids of said tubes, and means for applying said control voltage to at least one of said tubes.

3. Apparatus according to claim 1, wherein said mixing device comprises a potentiometer connected between the corresponding first output terminals of said two channels and having a variable tap, the position of said tap determining the ratio of said complementary parts of said channel output voltages.

4. Apparatus according to claim 1, wherein said means for generating a time deflection voltage is constructed to generate specifically a stroboscopic time deflection voltage, and wherein said circuit means connected through said transmission line between said test impulse generator and said oscilloscope include a sampling gate and further include a band pass filter, the input terminals of said band pass filter being connected to the output of said sampling gate, a sawtooth generator for producing a sawtooth voltage, said sawtooth voltage being synchronized with said controlling impulses, a comparator connected with said means for generating said stroboscopic voltage and with said sawtooth generator, circuit means for connecting the output of said comparator with said sampling gate, and circuit means for connecting said means for generating said stroboscopic time deflection voltage with said control device, said stroboscopic time deflection voltage serving as said control voltage.

5. Apparatus according to claim 1, in combination with one serially connected amplifier unit having a gain-frequency characteristic identical to that of said first channel of said two-channel amplifier.

6. Apparatus according to claim 1, in combination with several serially connected amplifier units having identical gain-frequency characteristics, said gain frequency characteristic being identical to that of said first channel of said two-channel amplifier.

7. Apparatus according to claim 6, wherein said amplifier units as well as the first channel of the two-channel amplifier comprise respectively an amplifier stage having a cathode resistor which is divided into two parts, one of these parts being shunted by an RC-network constructed as a parallel circuit of a plurality of RC-series combinations so as to produce a gain-frequency characteristic for equalizing a specific length of said line.

8. Apparatus according to claim 7, wherein the RC-networks of the amplifier units are respectively independently operatively connected to the shunted part of the cathode resistance by means of switch members.

9. Apparatus according to claim 8, comprising a control impulse generator connected with said means for generating said stroboscopic time deflection voltage for producing controlling impulses, said controlling impulses being synchronized with said stroboscopic time deflection voltage, and circuit means connecting said control impulse generator with said switch members, said control impulses serving as a switching voltage for successively operating said switch members.

10. Apparatus for use with an electrical transmission line under test, for testing impedance irregularities therein, comprising a source of controlling impulses, means for generating test impulses at a given rate for application to said transmission line, said controlling impulses being synchronized with said test impulses, a two-coordinate recorder having horizontal and vertical deflection means for visually indicating the results of the test, means for generating a time deflection voltage for said horizontal deflection means, circuit means connected to said transmission line between said test impulse generator and said recorder connecting the line and the vertical deflection means of said recorder including time-controllable equalizing means for equalizing the distortion of said test impulses, said equalizing means comprising a two-channel amplifier, the first channel of said amplifier having a gain-frequency characteristic for equalizing a specific length of said line, the second channel of said amplifier having a gain independent of frequency and equal to the gain of said first channel for the lowest frequencies, the inputs and outputs of said first and second channels being connected in parallel, phase shifting means in said second channel for equalizing the phase shift produced in said first channel, a mixing device connected to the outputs of said first and second channels, a control device connected with said mixing device and with a voltage generator, said control device having controllable means for causing said mixing device to take complementary parts from the output voltage of said first channel and from the output voltage of said second channel and to combine said parts to form a summary voltage, the ratio of said complementary parts being dependent on the amplitude of a voltage produced by said voltage generator and serving as a control voltage for said control device.

References Cited by the Examiner

UNITED STATES PATENTS 2,477,023  7/1949  Weaver _____ 324—57

WALTER L. CARLSON, *Primary Examiner.*

E. E. KUBASIEWICZ, *Assistant Examiner.*